(12) United States Patent
Wilson

(10) Patent No.: US 6,263,906 B1
(45) Date of Patent: Jul. 24, 2001

(54) OVERFLOW PROOF FLUID LEVEL CONTROLLER

(75) Inventor: Charles E. Wilson, Ballwin, MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/417,968

(22) Filed: Oct. 13, 1999

(51) Int. Cl.⁷ ................ F16K 31/18; E04H 4/12

(52) U.S. Cl. ................ 137/428; 137/563; 4/508

(58) Field of Search ................ 137/428, 426, 137/563, 511, 512, 528; 4/508

(56) References Cited

U.S. PATENT DOCUMENTS

| | | |
|---|---|---|
| 1,788,827 * | 1/1931 | Ferrin ................ 137/428 X |
| 2,620,819 | 12/1952 | Campbell . |
| 2,756,768 | 7/1956 | Dukas . |
| 3,908,206 * | 9/1975 | Grewing ................ 137/428 X |
| 4,116,128 | 9/1978 | Lehmann et al. . |
| 4,373,220 * | 2/1983 | Selsted ................ 137/428 X |
| 5,176,167 * | 1/1993 | Tiao ................ 137/428 X |
| 5,607,002 | 3/1997 | Siegele et al. . |
| 5,790,991 * | 8/1998 | Johnson ................ 137/428 X |

* cited by examiner

Primary Examiner—Kevin Lee
(74) Attorney, Agent, or Firm—Harness Dickey & Pierce P.L.C.

(57) ABSTRACT

A mechanical fluid controller incorporates a float assembly which is disposed within an auxiliary reservoir. An outlet of the auxiliary reservoir is coupled to a U-shaped conduit, which is in turn coupled to an inlet of a primary reservoir. At least one one-way check valve is disposed in the U-shaped conduit. The auxiliary reservoir also has an inlet that is coupled to a pressurized fluid source. The fluid level in the auxiliary reservoir is initially set approximately equal to the desired upper level of the fluid in the primary reservoir. As the fluid level in the primary reservoir drops, the auxiliary reservoir "sees" this as a drop in the hydrostatic pressure at the outlet side of the U-shaped tube, and fluid automatically flows through the tube into the primary reservoir. The float assembly senses the drop in the fluid level in the auxiliary reservoir and automatically admits water from the pressurized fluid source to bring the fluid level in the auxiliary reservoir back up to the desired upper level. A drain overflow port of the auxiliary reservoir is disposed below an upper edge of the primary reservoir. In this manner, the controller functions to continuously add fluid to the auxiliary reservoir, as needed, to maintain both reservoirs at an approximate common, desired upper level.

15 Claims, 1 Drawing Sheet

OVERFLOW PROOF FLUID LEVEL CONTROLLER

TECHNICAL FIELD

This invention relates to controllers for maintaining a desired fluid level in a fluid reservoir, and more particularly to a mechanical controller which automatically admits fluid from an auxiliary fluid reservoir into a primary fluid reservoir to maintain the level of the fluid in the primary reservoir at a predetermined level, and which further completely removes the risk of overflow to the primary reservoir.

BACKGROUND OF THE INVENTION

BACKGROUND ART

Fluid level controllers are used in a wide variety of applications to monitor the level of fluids in reservoirs or containers to ensure that a desired fluid level is maintained. Most often, such fluid level controllers are of an electrical type which senses the level of fluid in the reservoir being monitored and determines, electronically, when and how much fluid to add from a supply source to maintain the level of fluid in the reservoir at a desired level. However, such electronic controllers suffer from several drawbacks. For one, such controllers require an external power source to power the electronic components. This limitation makes an electronic controller susceptible to malfunctioning caused by a power outage. When the fluid reservoir being monitored is needed for a manufacturing operation, even temporary malfunctioning of the electronic controller can seriously disrupt a manufacturing process. If the reservoir being monitored is used in a chemical manufacturing process, a fluid shortage can affect the desired composition of the fluid, thereby detrimentally affecting the manufacturing process itself or components manufactured from the process. Conversely, an overflow of the reservoir is equally problematic since the contents of the primary reservoir often comprise a chemical composition which can represent a serious hazard to the environment should the reservoir overflow. Thus, preventing an overflow of the reservoir is just as important as maintaining a proper fluid level therein and, in some instances, even more important.

Electronic controllers are often relatively complicated devices having a number of independent parts that are susceptible to temperature, humidity and other environmental factors. Failure, or even intermittent malfunctioning, of just a single electronic component can often result in malfunctioning of the entire controller and hence overflow of the primary reservoir.

Still another drawback with conventional electronic controllers is their cost. These devices often represent a significant investment to the user. Installation is also not always straightforward and often requires highly skilled technicians to install and calibrate the controller. Frequently re-calibration of an electronic controller is needed to maintain optimum performance.

Another option for maintaining a fluid level within a reservoir at a desired level is simply periodically manually adding fluid as needed. Obviously, this also has a number of drawbacks, not the least of which is the manpower required to continuously monitor the reservoir and to add fluid as needed. This method is also susceptible to human error and does not lend itself easily to those applications where refilling is needed on a highly frequent basis to maintain the fluid level of a reservoir within a narrow predetermined range.

Accordingly, it is a principal object of the present invention to provide a fluid level controller which can be reliably used to maintain the level of a fluid within a fluid reservoir with no risk of overflow to the reservoir, and without the need for an electrically powered circuit for monitoring and adding fluid to the reservoir as needed.

It is another object of the present invention to provide a fluid level controller which is completely mechanical in its operation, and therefore which is not susceptible to the shortcomings of electronic fluid level controllers.

It is another object of the present invention to provide a fluid level controller which is operable to monitor the level of, and replenish if needed, the fluid within a primary reservoir without the need for complicated electronic fluid level monitoring equipment.

It is another object of the present invention to provide an entirely mechanical fluid level controller which operates to monitor and precisely add fluid, as needed, to a primary reservoir, and which eliminates entirely the chance of an overflow of the primary reservoir because of having added too much fluid to the primary reservoir.

It is still another object of the present invention to provide a fluid level controller that requires virtually no periodic maintenance, can be implemented in a variety of operating environments with little or no modification to a reservoir with which it is used, is cost efficient to construct and operate, and is generally not susceptible to variations in ambient temperature, humidity or other environmental factors which could affect conventional electronic controller systems.

SUMMARY OF THE INVENTION

The above and other objects are provided by a fluid level controller in accordance with preferred embodiments of the present invention. The fluid level controller of the present invention is a strictly mechanical fluid level controller that requires no source of electrical power for its operation. As such, it is unaffected by electrical power outages, power surges or "brown outs". The controller of the present invention, being mechanical in nature, is not affected by temperature, humidity or other environmental factors which limit the effectiveness of electronic controller systems which frequently require a number of sensitive electronic components for their operation, which components can also be significantly affected by the above-mentioned environmental factors.

The controller of the present invention makes use of an auxiliary reservoir which has a fluid outlet coupled to an inlet of a primary reservoir by a conduit. Preferably, this is a U-shaped conduit. The level of the fluid in the primary reservoir is the level which is ultimately controlled by the controller of the present invention. The fluid in the conduit experiences or "sees" the hydrostatic pressure exerted by the fluid in the primary reservoir. Thus, as the fluid level in the primary reservoir drops, such as because of evaporation, the hydrostatic pressure sensed by the fluid in the auxiliary reservoir, at the inlet of the primary reservoir, drops thus causing fluid to flow through the conduit into the primary reservoir in an attempt to maintain the fluid level in the primary reservoir at is former level.

Within the auxiliary reservoir is a float assembly which monitors the level of the fluid therein. The level of this fluid is set during installation of the controller to match the desired upper level of the fluid in the primary reservoir. An inlet of the auxiliary reservoir is coupled to a pressurized fluid source, such as a source of pressurized water.

Importantly, the auxiliary reservoir includes an overflow drain conduit near an upper end thereof which is disposed at a lower elevational level than an upper edge of the primary reservoir. In this manner, there is little possibility of an overflow of the auxiliary reservoir and absolutely no risk of overflow at all to the primary reservoir. Additionally, it will be noted that the upper edge of the auxiliary reservoir is disposed at a lower elevational level than the upper edge of the primary reservoir to eliminate any possibility of an overflow of the primary reservoir.

The float assembly functions to admit pressurized fluid through a valve thereof once the float reaches a predetermined lower level. When the float rises to the predetermined upper level its internal valve closes, thus interrupting flow into the auxiliary reservoir. The float assembly thus functions to maintain the fluid level in the auxiliary reservoir at the predetermined upper level. Even a failure of the float assembly cannot cause an overflow of the primary reservoir because of the lower elevational positioning of the upper edge of the auxiliary reservoir, as well as the overflow drain conduit, relative to the upper edge of the primary reservoir.

As the fluid level in the primary reservoir drops, such as because of evaporation, fluid immediately begins to flow from the auxiliary reservoir, through the conduit, and into the primary reservoir to replenish the primary reservoir. The float assembly senses this condition and begins to admit pressurized fluid into the auxiliary reservoir until its fluid level is brought back up to the predetermined upper level. In this manner fluid is added only when needed to the primary reservoir, and only that quantity necessary to bring the upper level of the fluid in the primary reservoir back up to the predetermined upper level is added. The operation is therefore strictly mechanical and serves to maintain the fluid level within the auxiliary and primary reservoirs equal to each other, and equal to the predetermined upper level.

In the preferred embodiments at least one one-way check valve is disposed in the conduit to prevent the backflow of fluid from the primary reservoir into the auxiliary reservoir. This condition could otherwise occur, for example, if a large component was lowered into the primary reservoir momentarily, which could cause the fluid level in the primary reservoir to rise significantly, and thus cause an outflow of fluid from the primary reservoir, through the conduit and back into the auxiliary reservoir.

In one preferred embodiment the conduit is coupled to the outlet of the auxiliary reservoir by a compression coupling which allows the elevation of the entire auxiliary reservoir to be adjusted relative to the primary reservoir. This is useful for applications where the upper level of the fluid in the primary reservoir would need to be raised to a level that could not be matched in the auxiliary reservoir without overspilling of the contents of the auxiliary reservoir. In such an instance, the entire auxiliary reservoir can be adjust elevationally such that the upper level of the fluid therein can be set to match the desired upper fluid level of the primary reservoir.

BRIEF DESCRIPTION OF THE DRAWINGS

The various advantages of the present invention will become apparent to one skilled in the art by reading the following specification and subjoined claims and by referencing the following drawing in which:

DETAILED DESCRIPTION OF THE PREFERRED EMBODIMENTS

Figure 1:
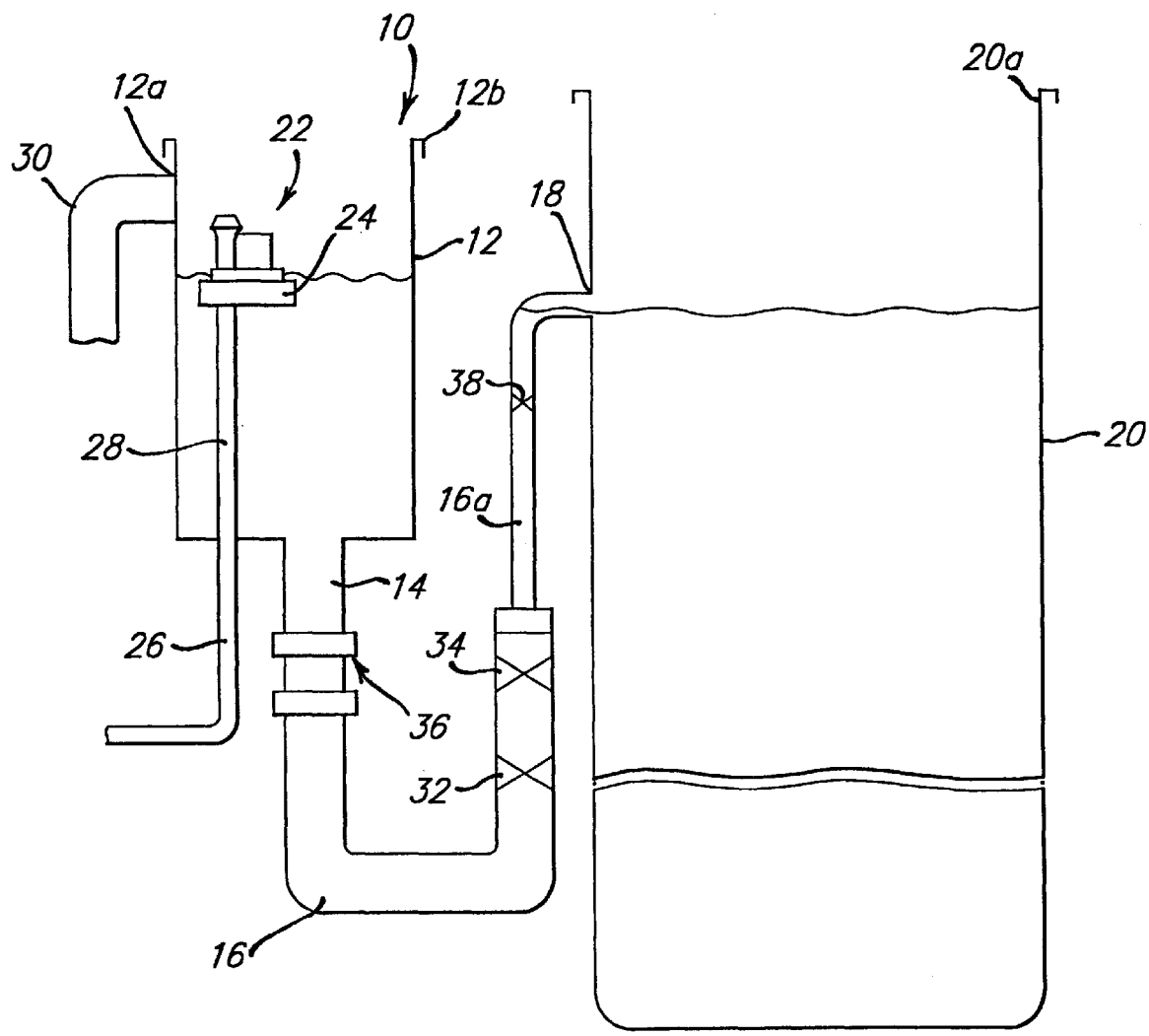
FIG. 1 is a simplified diagrammatic view of a fluid controller in accordance with a preferred embodiment of the present invention, with the controller of the present invention coupled to a pressurized fluid source and also to an inlet of a primary reservoir which is being monitored.

Referring to FIG. 1, there is shown a fluid controller 10 in accordance with a preferred embodiment of the present invention. The fluid controller 10 includes an auxiliary reservoir 12 having an outlet 14. The outlet 14 is coupled to a conduit, preferably a U-shaped conduit 16, which is in turn coupled to an inlet 18 of a primary reservoir 20. The primary reservoir 20 is the reservoir whose fluid level needs to be monitored and maintained at a predetermined upper level without risk of overflow. As such, the primary reservoir 20 does not form a part of the controller 10, but rather its fluid level is controlled by the controller 10 to maintain it at the predetermined upper level.

It will be appreciated that auxiliary reservoir 12 will typically be much smaller in capacity than primary reservoir 20. In one preferred embodiment, auxiliary reservoir 12 may comprise a PVC tube capable of holding only a gallon, while primary reservoir 20 may have a capacity of 3000 gallons or more.

The controller 10 further includes a float assembly 22 which is disposed within the auxiliary reservoir 12. The float assembly 22 includes a float member 24 and a supply fluid line 26 which is coupled to a source of pressurized fluid, such as a source of pressurized water. The float operates in conventional fashion by moving slidably up and down a portion 28 of the fluid supply line 26 within the reservoir 12 in direct response to changing fluid levels within the auxiliary reservoir 12.

Preferably, an overflow drain line 30 is coupled to an overflow drain port 12a at an upper end of the auxiliary reservoir 12. This permits any overflow of fluid within the auxiliary reservoir to be drained therefrom in the event the fluid level in the auxiliary reservoir 12 should rise beyond the predetermined upper level for any reason. It is important to note that the upper edge 12b of the auxiliary reservoir 12, as well as the upper end of the overflow drain line 30 which communicates with the interior of the auxiliary reservoir 12, is disposed elevationally below an upper edge 20a of the primary reservoir 20. This entirely eliminates any possibility of an overflow of the primary reservoir 20. Thus, even a malfunction of the float assembly 22 cannot cause an uncontained overflow of auxiliary reservoir 12 and, more importantly, absolutely no overflow of the primary reservoir 20. In a worst case scenario, if the valve 22 failed and overflow drain line 30 was inadvertently blocked, the primary reservoir 12 fluid could only rise to the elevational level of the auxiliary reservoir 12 upper edge 12b level, which is elevationally lower than the upper edge 20a of the primary reservoir 20.

In the preferred embodiments at least one, low flow resistance, one-way check valve 32 is disposed in the U-shaped conduit 16 to permit fluid flow only from the auxiliary reservoir 12 into the primary reservoir 20. More preferably, a second, low flow resistance, one-way check valve 34 identical to check valve 32 is also disposed in the U-shaped conduit 16, and orientated to also permit flow only from the auxiliary reservoir 12 into the primary reservoir 20. Second check valve 34 thus forms a back-up check valve in the event valve 32 should fail. At least one one-way check valve is desirable to prevent fluid flow from the primary reservoir 20 into the auxiliary reservoir 12 in the event a part or component is lowered into the primary reservoir 20, thus causing its fluid level to rise significantly. Such a condition would raise the hydrostatic pressure "seen" by the fluid in the U-shaped conduit 16 which would, without a check valve, cause backflow of a quantity of fluid through the conduit 16 and into the auxiliary reservoir 12. In those applications where corrosive chemicals are contained in the primary reservoir 20, such a situation could potentially cause damage to the components of the float assembly 22. The U-shaped 16 conduit also helps to provide both a chemical and temperature "buffer" zone to further isolate and protect the mechanical components within the auxiliary reservoir 12 from coming in contact with potentially hot and harmful fluid from the primary reservoir 20. Thus, the auxiliary reservoir 12 and the float assembly 22 are protected from the harsh fluids contained in the primary reservoir 20. This is a significant advantage over previously developed systems which require some form of float or other control assembly to be contained directly in the main reservoir, and to therefore be in constant contact with often harsh, harmful chemicals which can eventually affect the operation and/or reliability of the float assembly or other form of controller. Portion 16a of the U-shaped tube may also be comprised of a high temperature polymer material if a high temperature and corrosive fluid composition is being contained in the primary reservoir 20.

In one preferred embodiment of the present invention a conventional compression coupling 36 is disposed inbetween the fluid outlet 14 and the U-shaped conduit 16. The compression coupling 36 allows the entire auxiliary reservoir 12 to be adjusted in height if needed. It will be appreciated, however, that this feature is not essential to operation of the controller 10 in proper monitoring and filling of the primary reservoir 20.

In another preferred embodiment, an on/off valve 38 is disposed in the U-shaped conduit 16. The on/off valve 38 is a fully manual valve that may be closed to prevent fluid flow through the conduit 16, either into the primary reservoir 20 or therefrom. The primary use of this valve 38 is to conveniently isolate the primary reservoir 20 for maintenance or adjustment of the controller 10. Again, this valve 38 is completely optional and is not necessary to the proper functioning of the controller 10.

Turning now to the operation of the controller 10, the fluid level in the auxiliary reservoir 12 is set to approximately match the predetermined upper level of the fluid in the primary reservoir 20. This is done by adding fluid to the auxiliary reservoir 12 until its upper level is about the same as that of the fluid in the primary reservoir 20 when the fluid in the primary reservoir 20 is at the predetermined (i.e., desired) upper level. In practice, it will be appreciated that the upper level of the fluid in the auxiliary reservoir 12 will need to be set just slightly higher than the desired upper level of the fluid in the primary reservoir 20 so as to overcome the slight flow resistance imparted by the check valves 32 and 34. The float assembly 22 is adjusted such that its internal valve has just closed when the float member 24 thereof is resting in the auxiliary reservoir 12 with the fluid therein at the predetermined upper level. If the on/off valve 38 is incorporated, it will be in the "on" (i.e., open) position.

As the fluid level in the primary reservoir 20 drops, such as because of evaporation, the fluid in the auxiliary reservoir 12 "sees" a lower hydrostatic pressure at the inlet 18 of the primary reservoir 20, and fluid automatically flows through the U-shaped conduit 16 into the primary reservoir 20 in an attempt to equalize the levels of the fluids within the two reservoirs 12 and 20. The float member 24 of the float assembly 22 immediately begins to drop, and this is quickly sensed by the float assembly 22, which causes its internal valve to open, thereby admitting pressurized fluid through supply fluid line 26 into the auxiliary reservoir 12. The internal valve of the float assembly 22 remains open allowing the auxiliary reservoir 12 to be replenished with an additional quantity of fluid until the fluid level reaches the predetermined upper level, which will be sensed by the float assembly 22 when the float member 24 is raised back up to this level within the auxiliary reservoir 12. At this point the internal valve of the float assembly 22 closes. This cycle is repeated as often as the fluid level in the primary reservoir 12 drops to the predetermined lower level, which triggers the float assembly 22 to add the necessary quantity of water into the auxiliary reservoir 12 to maintain the fluid levels in the two reservoirs 12 and 20 at the predetermined upper level. Any overflow of the auxiliary reservoir 12 is harmlessly drained away through overflow drain line 30.

If the compression coupling 36 is incorporated, then the entire height of the auxiliary reservoir 12 may be adjusted if a significant change needs to be made to the predetermined upper fluid level. It will be appreciated, however, that if this feature is incorporated, then suitable structure will need to be associated with the auxiliary reservoir 12 to enable it to be lifted and maintained at its new height.

The controller 10 of the present invention thus does not require costly electronic components for its operation in maintaining a fluid level within a reservoir at a desired upper level. The controller 10 is thus not subject to the shortcomings associated with electronic controller systems which are susceptible to heat, humidity and other environmental factors, in addition to interruptions in electrical power. The controller 10 thus forms a relatively low cost but reliable means for maintaining a fluid level within a reservoir at a relatively constant level, with no risk of overflow, regardless of the type of fluid being contained in the primary reservoir 20.

It will be appreciated that the controller 10 could also be configured to operate without the float assembly 22, provided a continuous supply of pressurized fluid is admitted into the auxiliary reservoir 12 that causes a continuous overflow of fluid out of the overflow drain line 30. In this instance, the elevational level of the drain port 12a would be set equal to the desired level at which the fluid in the primary reservoir 12 is to be maintained. For those applications where tap water is being used to refill the auxiliary reservoir 12, and where a small amount of water can afford to be wasted, this modification permits the auxiliary reservoir 12 fluid level to be controlled without the float assembly 22.

Still another modification could involve implementing a third reservoir positioned at a lower elevation and continuously supplying a pressurized fluid from the third reservoir via pump to cause the auxiliary reservoir 12 to continuously drain out through the overflow drain port 12a into the third reservoir. In this manner, the use of the float assembly 22 could be entirely eliminated and special composition fluid could continuously be mixed and added to the primary reservoir 20 as needed.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A liquid level controller for automatically adding a first fluid to a reservoir to maintain the level of a second fluid within a primary fluid reservoir at a desired level without any risk of overflow to the primary reservoir, the controller comprising:

an auxiliary fluid reservoir for holding a quantity of said first fluid;

an overflow drain conduit in communication with an overflow drain port of said auxiliary fluid reservoir for preventing overflow of said auxiliary reservoir, and thus for also preventing overflow of said primary reservoir, said overflow drain port being disposed at a lower elevational level than an upper edge of said primary reservoir to eliminate a risk of overflow of said primary reservoir;

a conduit coupling an output of said auxiliary fluid reservoir with an inlet of said primary reservoir;

a one way check valve disposed in said conduit for allowing flow through said conduit only into said primary reservoir without any risk of overflow to the primary reservoir;

a float mechanism disposed within said auxiliary reservoir and set to maintain a level of said first fluid held therein at a level corresponding approximately to said desired level of the second fluid in said primary reservoir, said float mechanism being operably associated with a fluid supply conduit for monitoring a level of said first fluid within said auxiliary reservoir and admitting an additional quantity of said first fluid from an external fluid source through said fluid supply conduit into said auxiliary reservoir when the level of said first fluid in said auxiliary reservoir drops to a predetermined lower level as a result of a reduction of the quantity of said second fluid in said primary reservoir, to thereby automatically cause a quantity of said first fluid to be added to said primary reservoir to maintain the level of fluid in said primary reservoir approximately at said desired level.

2. The controller of claim 1, wherein said conduit comprises a U-shaped conduit.

3. The controller of claim 1, wherein said conduit comprises a U-shaped conduit; and wherein said controller further comprises a compression coupler for coupling said U-shaped conduit to said auxiliary reservoir.

4. The controller of claim 1, wherein said controller further comprises:

a first one-way check valve disposed in said conduit for preventing flow of fluid from said primary reservoir into said auxiliary reservoir; and a second one-way check valve disposed in said conduit for preventing flow of fluid from said primary reservoir into said auxiliary reservoir in the event of a failure of said first one-way check valve.

5. The controller of claim 1, wherein an upper edge of said auxiliary reservoir is disposed at an elevationally lower level than said upper edge of said primary reservoir.

6. A liquid level controller for automatically maintaining the level of a fluid within a primary reservoir at a desired level without any risk of overflow to the primary reservoir, the controller comprising:

an auxiliary fluid reservoir for holding a quantity of a first fluid, said auxiliary fluid reservoir being in fluid communication with a pressurized fluid source and having an upper overflow drain port disposed at a lower elevational level than an upper edge of said primary reservoir to eliminate a risk of overflow of said primary reservoir;

a generally U-shaped conduit coupling an output of said auxiliary fluid reservoir with an inlet of said primary reservoir;

said U-shaped conduit further comprising a one-way check valve for permitting flow therethrough only from said auxiliary reservoir into said primary reservoir;

a float mechanism disposed within said auxiliary reservoir and set to maintain a level of said first fluid held therein at a level corresponding approximately to a desired level of a second fluid in said primary reservoir by the opening of a valve thereof when said first fluid in said auxiliary reservoir drops to a predetermined lower level, to thereby allow fluid from said pressurized fluid source to be admitted into said auxiliary reservoir, said float mechanism being operably associated with a fluid supply conduit for monitoring a level of said first fluid within said auxiliary reservoir and admitting an additional quantity of fluid from said pressurized fluid source through said fluid supply conduit into said auxiliary reservoir when the level of said first fluid in said auxiliary reservoir drops to said predetermined lower level as a result of a reduction of the quantity of said second fluid in said primary reservoir, which causes an outflow of fluid through said U-shaped conduit into said primary reservoir, to thereby automatically maintain said first and second fluids at a generally common, desired level in their respective said reservoirs.

7. The controller of claim 6, further comprising a first one-way check valve inserted in said U-shaped conduit and operable to permit flow therethrough only from said auxiliary reservoir to said primary reservoir; and a second one-way check valve inserted in said U-shaped conduit and operable to permit flow only from said auxiliary reservoir to said primary reservoir in the event of a failure of said first one-way check valve.

8. The controller of claim 6, further comprising a compression coupling for coupling one end of said U-shaped conduit to said output of said auxiliary reservoir for permitting an elevation of said auxiliary reservoir above a ground level to be adjusted.

9. The controller of claim 6, further comprising a manually controlled on/off valve for isolating said auxiliary reservoir from said primary reservoir.

10. The controller of claim 6, wherein an upper edge of said auxiliary reservoir is disposed at a lower elevational level than said upper edge of said primary reservoir.

11. A controller for automatically maintaining a level of a fluid within a primary reservoir at a desired level, said controller comprising:

an auxiliary reservoir for holding a quantity of a first fluid therein used to replenish said primary reservoir, and having an overflow drain port coupled to an external overflow drain conduit, said overflow drain port further being disposed at a lower elevational level than an upper edge of said primary reservoir to thus eliminate the risk of an overflow of said primary reservoir;

said auxiliary reservoir being in communication with a pressurized fluid source for supplying pressurized fluid to said auxiliary reservoir;

a conduit coupled to an outlet of said auxiliary reservoir and an inlet of said primary reservoir for controlling flow of said first fluid from said auxiliary reservoir to said primary reservoir;

a one-way check valve disposed in said conduit for permitting fluid flow only from said auxiliary reservoir to said primary reservoir and preventing flow from said primary reservoir into said auxiliary reservoir;

a level of a second fluid in said auxiliary reservoir being initially set substantially equal to a desired fluid level of said first fluid in said primary reservoir;

a float assembly disposed in said auxiliary reservoir for monitoring the level of said first fluid in said auxiliary reservoir and for allowing said pressurized fluid to be admitted into said auxiliary reservoir automatically when said level of said first fluid in said auxiliary reservoir drops to said predetermined lower level as a result of an outflow of said first fluid through said conduit after a drop in the level of said second fluid in said primary reservoir, said float assembly thereby operating to maintain said level of said first fluid in said auxiliary reservoir and said second fluid in said primary reservoir at an approximately common, desired upper level.

12. The controller of claim 11, further comprising a coupling assembly for coupling said outlet of said auxiliary reservoir with said inlet of said primary reservoir in a manner that permits vertical adjustment of said auxiliary reservoir relative to said primary reservoir, thus aiding installation and proper positioning of said auxiliary reservoir.

13. The controller of claim 11, further comprising an on/off valve for preventing fluid flow through said U-shaped conduit regardless of the level of said fluid within said primary reservoir, thus isolating said auxiliary reservoir from said primary reservoir.

14. The controller of claim 11, wherein an upper edge of said auxiliary reservoir is disposed at a lower elevational level than said upper edge of said primary reservoir.

15. A liquid level controller for automatically adding a first fluid to a reservoir to maintain the level of a second fluid within a primary fluid reservoir at a desired level without any risk of overflow to the primary reservoir, the controller comprising:

an auxiliary fluid reservoir for holding a quantity of said first fluid;

an overflow drain conduit in communication with an overflow drain port of said auxiliary fluid reservoir for preventing overflow of said auxiliary reservoir, and thus for also preventing overflow of said primary reservoir, said overflow drain port being disposed at a lower elevational level than an upper edge of said primary reservoir to eliminate a risk of overflow of said primary reservoir;

a conduit coupling an output of said auxiliary fluid reservoir with an inlet of said primary reservoir;

a first one-way check valve disposed in said conduit for preventing flow of said primary reservoir into said auxiliary reservoir;

a second one-way check valve disposed in said conduit for preventing flow of fluid from said primary reservoir into said auxiliary reservoir in the even of a failure of said first one-way check valve;

a float mechanism disposed within said auxiliary reservoir and set to maintain a level of said first fluid held therein at a level corresponding approximately to said desired level of the second fluid in said primary reservoir, said float mechanism being operably associated with a fluid supply conduit for monitoring a level of said first fluid within said auxiliary reservoir and admitting an additional quantity of said first fluid from an external fluid source through said fluid supply conduit into said auxiliary reservoir when the level of said first fluid in said auxiliary reservoir drops to a predetermined lower level as a result of a reduction of the quantity of said second fluid in said primary reservoir, to thereby automatically cause a quantity of said first fluid to be added to said primary reservoir to maintain the level of fluid in said primary reservoir approximately at said desired level.

* * * * *

UNITED STATES PATENT AND TRADEMARK OFFICE
CERTIFICATE OF CORRECTION

PATENT NO. : 6,263,906 B1
DATED : July 24, 2001
INVENTOR(S) : Charles E. Wilson

It is certified that error appears in the above-identified patent and that said Letters Patent is hereby corrected as shown below:

Title page,
ABSTRACT,
Replace ABSTRACT with the following ABSTRACT:

A mechanical fluid controller system for monitoring a fluid level within a primary reservoir and automatically adding fluid as needed to maintain the level of the fluid in the primary reservoir at a desired upper level, while completely eliminating the risk of overflow to the primary reservoir. The controller incorporates a float assembly which is disposed within an auxiliary reservoir. An outlet of the auxiliary reservoir is coupled to a U-shaped conduit, which is in turn coupled to an inlet of the primary reservoir. At least one one-way check valve is disposed in the U-shaped conduit to permit flow only from the auxiliary reservoir into the primary reservoir. The auxiliary reservoir also has an inlet that is coupled to a pressurized fluid source such as a pressurized water source. The fluid level in the auxiliary reservoir is initially set approximately equal to the desired upper level of the fluid in the primary reservoir. As the fluid level in the primary reservoir drops, the auxiliary reservoir "sees" this as a drop in the hydrostatic pressure at the outlet side of the U-shaped tube, and fluid automatically flows through the tube into the primary reservoir. The float assembly senses the drop in the fluid level in the auxiliary reservoir and automatically admits water from the pressurized fluid source to bring the fluid level in the auxiliary reservoir back up to the desired upper level. A drain overflow port of the auxiliary reservoir is disposed below an upper edge of the primary reservoir, which eliminates the risk of fluid overflow of the primary reservoir caused by an overflow of the auxiliary reservoir. In this manner, the controller functions to continuously add fluid to the auxiliary reservoir, as needed, to maintain both reservoirs at an approximate common, desired upper level.

UNITED STATES PATENT AND TRADEMARK OFFICE
CERTIFICATE OF CORRECTION

PATENT NO. : 6,263,906 B1
DATED : July 24, 2001
INVENTOR(S) : Charles E. Wilson

It is certified that error appears in the above-identified patent and that said Letters Patent is hereby corrected as shown below:

<u>Column 10,</u>
Line 16, claim 15 "even" should be -- event --.

Signed and Sealed this

Thirtieth Day of April, 2002

Attest:

Attesting Officer

JAMES E. ROGAN
*Director of the United States Patent and Trademark Office*